(12) United States Patent
Barnes et al.

(10) Patent No.: US 8,584,530 B2
(45) Date of Patent: Nov. 19, 2013

(54) WIND TURBINE GEARBOX TESTING SYSTEM

(75) Inventors: Ken Barnes, Northville, MI (US); Stephen Gibson, Farmington Hills, MI (US)

(73) Assignee: AVL Test Systems, Inc., Plymouth, MI (US)

( * ) Notice: Subject to any disclaimer, the term of this patent is extended or adjusted under 35 U.S.C. 154(b) by 278 days.

(21) Appl. No.: 12/857,677

(22) Filed: Aug. 17, 2010

(65) Prior Publication Data
US 2011/0041624 A1 Feb. 24, 2011

Related U.S. Application Data

(60) Provisional application No. 61/235,194, filed on Aug. 19, 2009.

(51) Int. Cl.
*G01N 3/02* (2006.01)
*G01L 1/22* (2006.01)

(52) U.S. Cl.
USPC .............................................. 73/856; 73/862

(58) Field of Classification Search
USPC .................................................. 73/856, 862
See application file for complete search history.

(56) References Cited

U.S. PATENT DOCUMENTS

| 7,178,406 | B2 * | 2/2007 | Gonzalez et al. | 73/856 |
| 7,819,019 | B2 * | 10/2010 | Bisgaard | 73/856 |
| 7,938,017 | B2 * | 5/2011 | Bisgaard | 73/856 |
| 7,963,160 | B2 * | 6/2011 | Bisgaard | 73/170.01 |
| 2005/0172729 | A1 * | 8/2005 | Gonzalez et al. | 73/856 |
| 2007/0265133 | A1 * | 11/2007 | Smook | 475/317 |
| 2009/0107255 | A1 * | 4/2009 | Jensen | 324/772 |
| 2009/0107256 | A1 * | 4/2009 | Jensen | 324/772 |
| 2009/0173148 | A1 * | 7/2009 | Jensen | 73/116.03 |
| 2010/0138060 | A1 * | 6/2010 | Gao et al. | 700/287 |
| 2011/0023629 | A1 * | 2/2011 | Bushey et al. | 73/862.581 |
| 2011/0033299 | A1 * | 2/2011 | Leimann et al. | 416/170 R |
| 2011/0133473 | A1 * | 6/2011 | Signore et al. | 290/55 |
| 2012/0029892 | A1 * | 2/2012 | Thulke | 703/7 |

* cited by examiner

*Primary Examiner* — Lisa Caputo
*Assistant Examiner* — Jonathan Dunlap
(74) *Attorney, Agent, or Firm* — Harness, Dickey & Pierce, P.L.C.

(57) ABSTRACT

A wind turbine gearbox test cell includes a cradle and a base mounted to a first support structure. Load devices are interconnected between the cradle and base and are configured to input at least one of thrust, radial and yaw loads to the gearbox through the cradle to a wind turbine gearbox under test. A controller is in communication with the load devices and is programmed to command the load devices to input the at least one of thrust, radial and yaw loads to the gearbox corresponding to a simulated wind turbine gearbox loading event. The test cell includes dynamometers and gearboxes that can be reconfigured based upon the particular wind turbine gearbox under test.

12 Claims, 4 Drawing Sheets

WIND TURBINE GEARBOX TESTING SYSTEM

This applications claims priority to U.S. Application No. 61/235,194, which was filed on Aug. 19, 2009.

BACKGROUND

This disclosure relates to a system and test device for testing wind turbine gearboxes. The disclosure also relates to a method of testing a wind turbine gearbox.

Prior approaches to testing wind turbine systems included applying forces against an input shaft to which wind turbine blades were attached to simulate in field wind turbine operation. The shaft is supported by large, slow speed bearings, which are not susceptible to failure. As a result, the majority of the forces applied to the test piece in prior art wind turbine system test procedures are absorbed by the bearings. The actual loads applied to the wind turbine gearbox, which are susceptible to failure, are not well controlled. Accordingly, current test procedures do not simulate wind turbine operating loads very well and do not provide a good indication as to how a wind turbine gearbox will perform in the field.

SUMMARY

A wind turbine gearbox test cell includes a cradle and a base mounted to a first support structure. Load devices are interconnected between the cradle and base and are configured to input at least one of thrust, radial and yaw loads to the gearbox through the cradle to a wind turbine gearbox under test. A controller is in communication with the load devices and is programmed to command the load devices to input the at least one of thrust, radial and yaw loads to the gearbox corresponding to a simulated wind turbine gearbox loading event. The test cell includes dynamometers and gearboxes that can be reconfigured based upon the particular wind turbine gearbox under test.

BRIEF DESCRIPTION OF THE DRAWINGS

The disclosure can be further understood by reference to the following detailed description when considered in connection with the accompanying drawings wherein.

DETAILED DESCRIPTION

Figure 1:
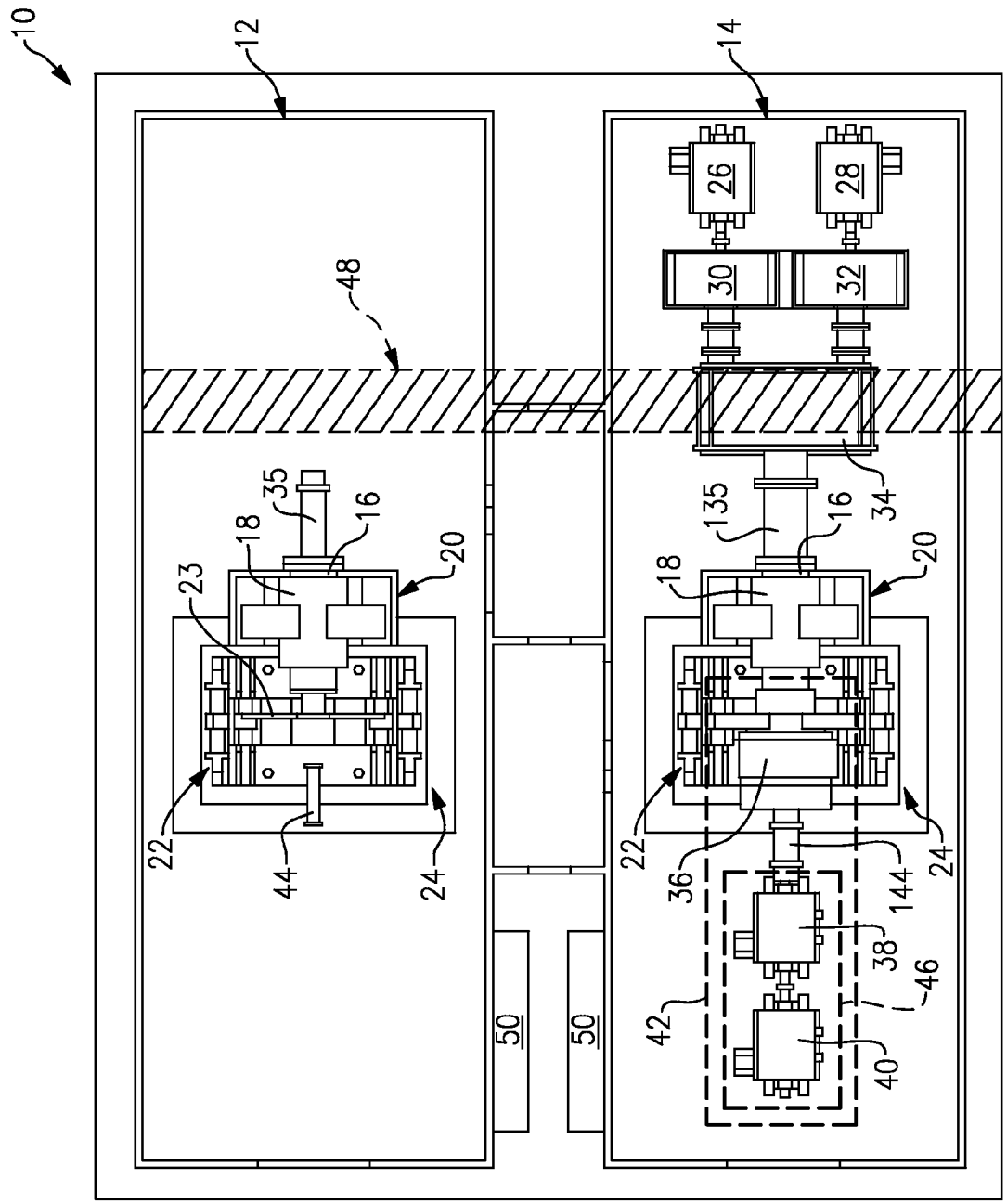
FIG. 1 is a first example test facility for a wind turbine gearbox.
Figure 3:
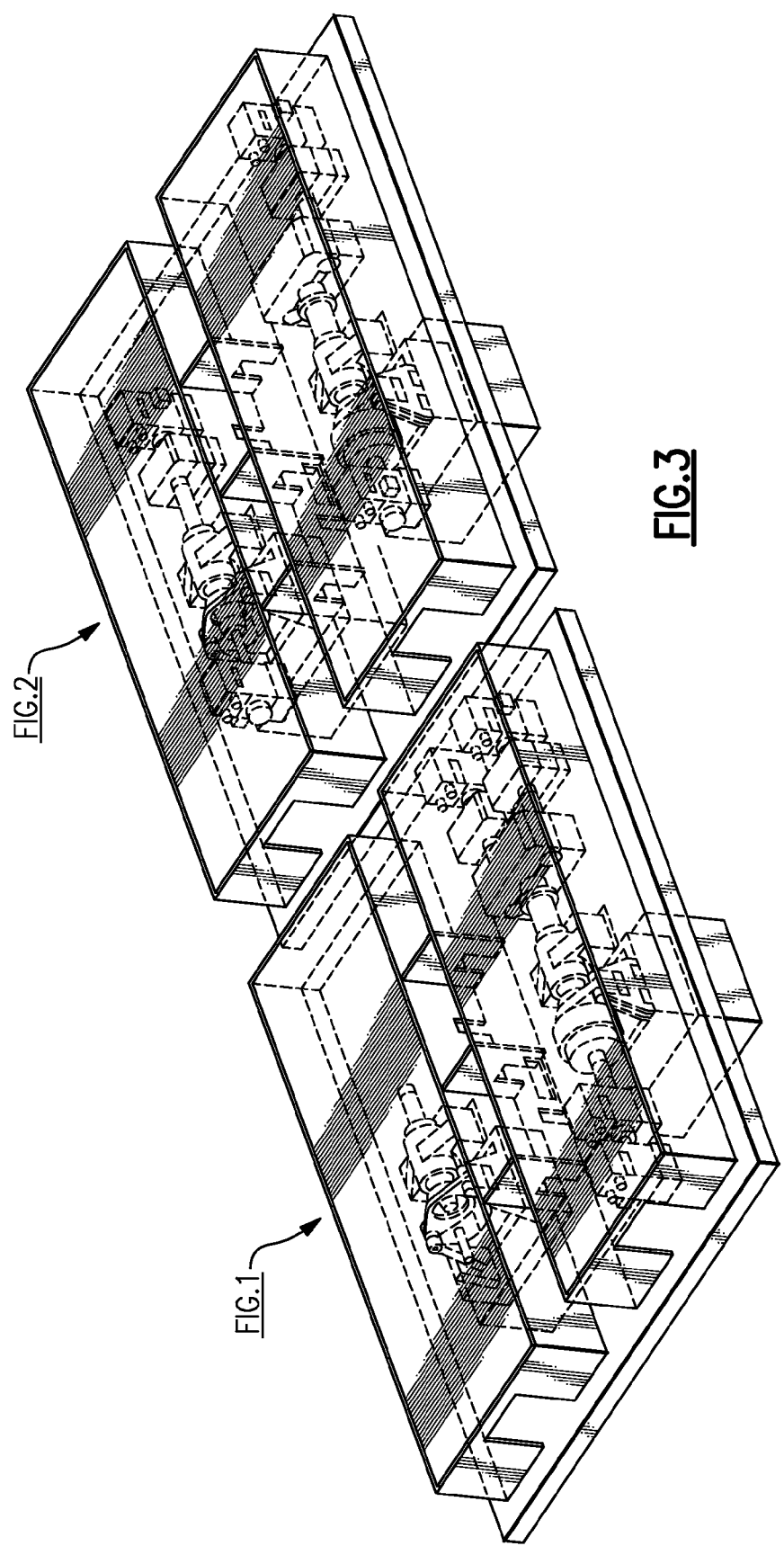
FIG. 3 is a perspective view of test facility, which includes the configurations illustrated in FIGS. 1 and 2.

FIG. 1 illustrates an example test facility 10 including first and second test cells 12, 14. It should be understood that more or fewer than two test cells may be used within a test facility 10, for example, as shown in FIG. 3.

In each example test cell, a bearing block 18 is provided that supports an input shaft 16. The input shaft 16 and bearing block 18 are similar to or the same as an input shaft for a wind turbine to which wind turbine blades attach. The bearing block 18 is mounted to a support structure 20, which includes a concrete pad in one example.

A gearbox test device 22 is arranged adjacent to the bearing block 18 such that the input shaft 16 can be coupled to a wind turbine gearbox during a test procedure. A wind turbine gearbox is not shown in the first test cell 12 for clarity. The gearbox test device 22 is mounted to a support structure 24, which is a concrete pit in one example.

The gearbox test device 22 may use an adapter plate 23 for accommodating wind turbine gearboxes of various sizes. In this manner, the test cell can be more easily configured to test different configurations. An input coupling 35 is secured to the input shaft 16 for receiving a rotational input. An output coupling 44 is provided to connect the wind turbine gearbox under test to a wind turbine generator or test dynamometer.

The second test cell 14 includes first and second dynamometers 26, 28 each capable of providing 10 megawatts at approximately 0 to 2,000 rpm. The first and second dynamometers 26, 28 are respectively coupled to first and second primary gearboxes 30, 32 each capable of receiving a maximum continuous power of approximately 10 megawatts at 30 rpm and providing a output of approximately 18 rpm, for example. The first and second primary gearboxes 30, 32 provide a 66.66:1 reduction ratio, for example.

A secondary gearbox 34 is provided with dual inputs and a single output to further reduce the rotational speed of the dynamometers 26, 28 to simulate the rotational input speed from wind turbine blades. In one example, the secondary gearbox 34 is capable of receiving 20 megawatts of power at 16 rpm and providing an output at 8 rpm. The secondary gearbox 34 provides a 2.25:1 reduction ratio in one example. The output torque provided by the secondary gearbox 34 is approximately 26 million Nm, for example.

A wind turbine gearbox 36 under test is schematically illustrated in the second test cell 14. The wind turbine gearbox 36 is coupled to the input shaft 16. The output coupling 44 interconnects the output of the wind turbine gearbox 36 to a series of third and fourth dynamometers 38, 40 that simulate a wind turbine generator. Alternatively, the wind turbine generator 46 may be coupled to the wind turbine gearbox 36. Furthermore, the entire nacelle 42 may be mounted within the test cell 14 to more closely simulate wind turbine operation in the field. It should be understood that different gearboxes, dynamometers and generators may be used depending on the test wind turbine gearbox under test.

An overhead crane 48, capable of moving 100 tons for example, is provided over the first and second test cells 12, 14. The overhead crane 48 is used to reconfigure the test cells 12, 14 into different testing configurations. More specifically, the first, second, third and fourth dynamometers 26, 28, 38, 40 and first and second primary gearboxes 30, 32 can be moved between the test cells 12, 14 depending upon the size of the wind turbine gearbox under test. Typically, the secondary gearbox 34 remains within the same test cell due to its size, which may approach 250 tons or more.

Figure 2:
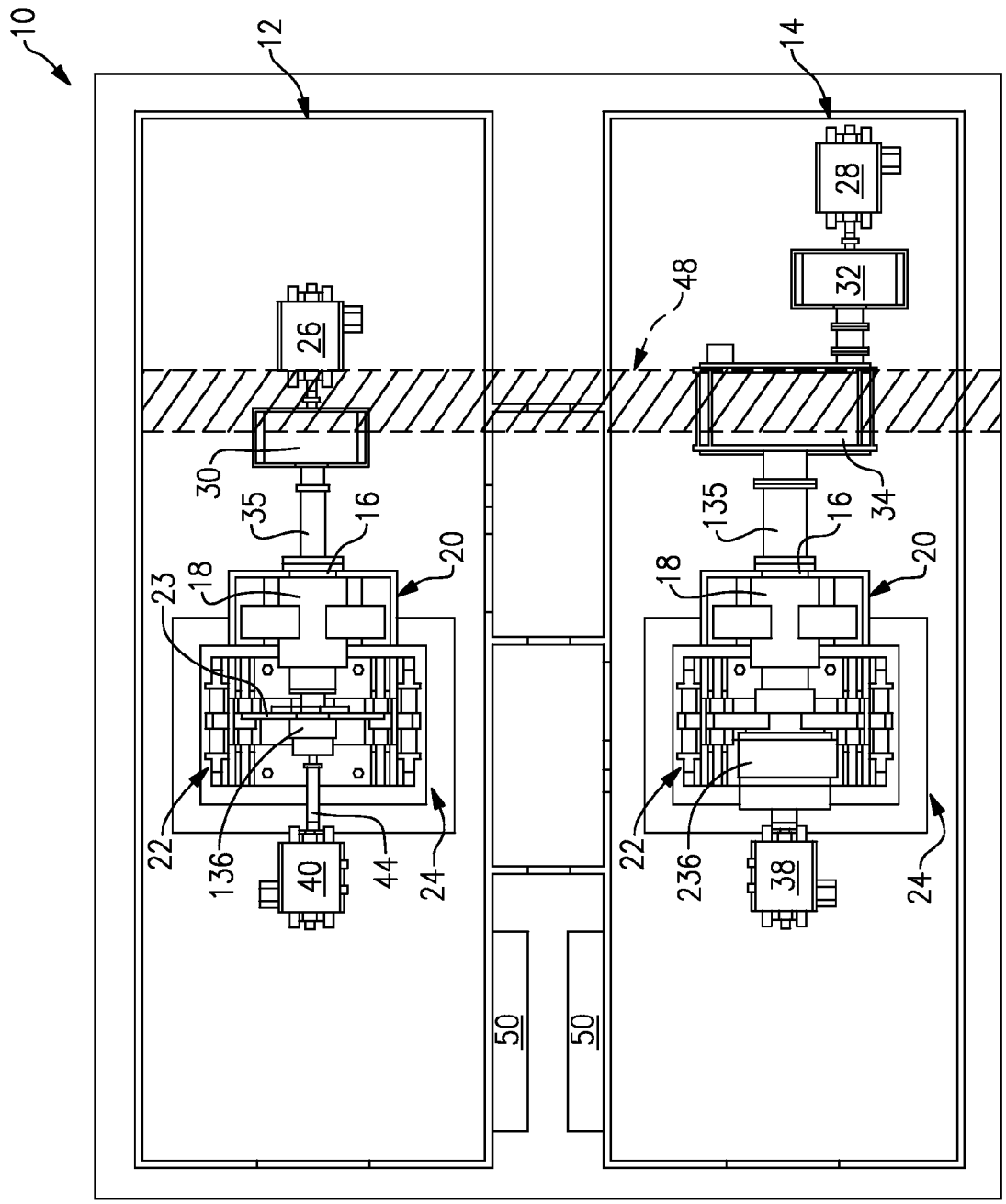
FIG. 2 is a second example test facility for another wind turbine gearbox.

FIG. 2 illustrates the first and second test cells 12, 14 after they have been reconfigured from the arrangements illustrated in FIG. 1. The first test cell 12 is configured to test a relatively small wind turbine gearbox 136, mounted to the adapter plate 23. The first dynamometer 26 rotationally drives the first primary gearbox 30, which is coupled to the input shaft 16 via the input coupling 35. The fourth dynamometer 40 is coupled to the output of the wind turbine gearbox 136 via the output coupling 44. The fourth dynamometer 40 simulates a wind turbine generator.

The second test cell 14 is configured to test an intermediate sized wind turbine gearbox 236. The second dynamometer 28 is coupled to the second primary gearbox 32, which is coupled to one of the inputs of the secondary gearbox 34. The secondary gearbox 34 is coupled to the input shaft 16 via the input coupling 135. The output of the wind turbine gearbox 236 is coupled to the third dynamometer 38. As can be appreciated from FIGS. 1 and 2, the flexible test facility 10 enables multiple wind turbine gearboxes to be tested simultaneously while providing the ability to test wind turbine gearboxes of various sizes.

Figure 4:
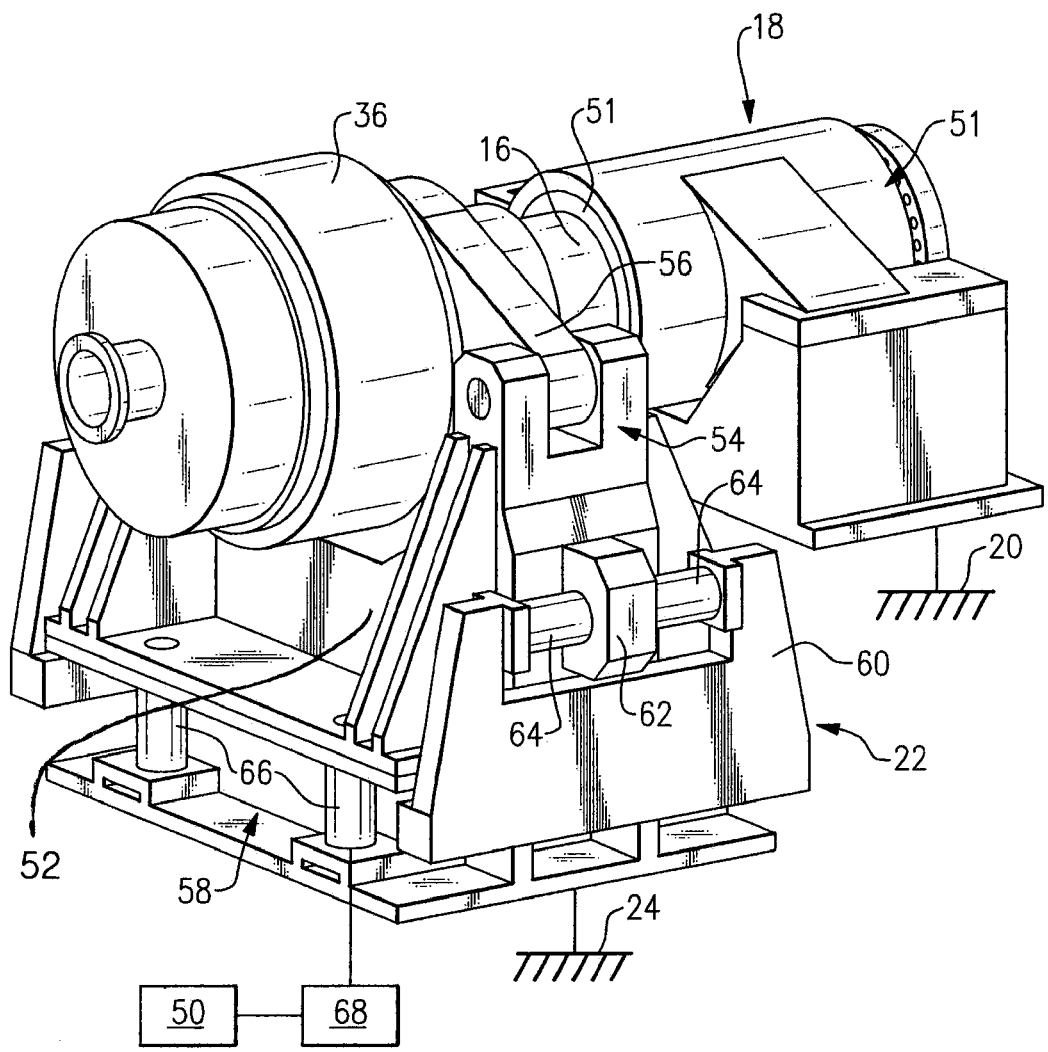
FIG. 4 is a perspective view of a cradle supporting the wind turbine gearbox and load devices used to simulate a wind turbine gearbox loading event.

Referring to FIG. 4, the test device 22 is illustrated in more detail. The bearing block 18 includes multiple large, slow speed bearings 51 that rotationally support the input shaft 16 providing a relatively fixed reaction shaft against which the wind turbine gearbox 36 can be tested. That is, relatively minimal distortion of the input shaft 16 occurs, such that the loading of the wind turbine gearbox 36 is somewhat isolated.

The gearbox test device 22 includes a cradle 52 supported on a base 58. The base 58 is mounted to the support structure 24. The cradle 52 provides a clevis 54 to which flanges 56 of the wind turbine gearbox housing 36 is secured. The base 58 includes spaced apart walls 60 extending vertically from a bottom wall of the base 58. The walls 60 are arranged on each side, and each pair of walls 60 receives one opposing ear 62, which extends from opposing sides of the cradle 52.

Load devices are provided between the base 58 and the cradle 52 to manipulate the wind turbine gearbox housing 36 about three axes, for example, to simulate a wind turbine gearbox loading event. In one example, the load devices include first and second sets that respectively arranged horizontally and vertically to provide thrust, radial and yaw loads. A pair of first hydraulic cylinders 64 are arranged between each ear 62 and their respective walls 60 on each side of the gearbox test device 22. A pair of second hydraulic cylinders 66 are arranged at each of forward and rearward sides of the gearbox test device 22 between the bottom wall and the cradle 52. While a total of eight hydraulic cylinders are shown, it should be understood that more or fewer hydraulic cylinders may be used. Also, load devices other than hydraulic cylinders can be used.

A hydraulic source 68 is coupled to the first and second hydraulic cylinders 64, 66 (only one connection is schematically shown for clarity). The hydraulic source 68 includes, for example, at least one pump, at least one reservoir and one or more control valves. A controller 50 communicates with the hydraulic cylinders 64, 66 via the hydraulic source 68. The controller 50 is programmed to provide thrust, radial, and yaw loads to the wind turbine gearbox 36 by manipulating one or more of the hydraulic cylinders 64, 66 to simulate a wind turbine gearbox loading event that typically occurs in the field. In one example, servo-hydraulics are used, which provide feedback to the controller 50.

Although example embodiments have been disclosed, a worker of ordinary skill in this art would recognize that certain modifications would come within the scope of the claims. For that reason, the following claims should be studied to determine their true scope and content.

What is claimed is:

1. A wind turbine gearbox test device comprising:
a cradle configured to support a gearbox relative to a fixed input shaft to be coupled to the gearbox, the fixed input shaft driven at a predetermined number of revolutions per minute (rpm) to rotationally drive the gearbox during a test procedure;
a base configured to mount on a support structure; and
load devices interconnected between the cradle and base and configured to input at least one of thrust, radial and yaw loads to the gearbox through the cradle, the load devices including a first set of load devices arranged in a transverse direction relative to a second set of load devices arranged to provide input loads about three axes, the first set of load devices arranged in a vertical direction and the second set of load devices arranged in a horizontal direction;
wherein the cradle includes a bottom wall generally parallel with the base, the first set of load devices arranged between the base and the bottom wall; and
wherein the base includes spaced apart sidewalls on each of opposing sides and extending vertically from the bottom wall, and the cradle includes an ear on each of the opposing sides and each arranged between a respective pair of the sidewalls, the load devices of the second set provided between the ears and their respective sidewalls.

2. The wind turbine gearbox test device according to claim 1, wherein in the load devices are hydraulic cylinders.

3. The wind turbine gearbox test device according to claim 1, wherein the cradle includes a clevis on each of the sides configured to support the wind turbine gearbox.

4. A wind turbine gearbox test cell comprising:
an input shaft operable to be selectively connected to a wind turbine gearbox;
a cradle operable to support the wind turbine gearbox relative to the input shaft;
a base mounted to a first support structure;
load devices interconnected between the cradle and base and configured to input at least one of thrust, radial and yaw loads to the gearbox through the cradle;
a controller in communication with the load devices and programmed to command the load devices to input the at least one of thrust, radial and yaw loads to the gearbox corresponding to a simulated wind turbine gearbox loading event;
a bearing block mounted to a second support structure and rotatably supporting the input shaft, the cradle arranged near the input shaft and configured to support the wind turbine gearbox during a test procedure; and
a first dynamometer operatively coupled to the input shaft and in communication with the controller to simulate a windmill turbine input.

5. The wind turbine gearbox test cell according to claim 4, wherein the load devices includes first set of load devices arranged in transverse direction relative to a second set of load devices arranged to provide input loads about thrust, radial and yaw axes.

6. The wind turbine gearbox test cell according to claim 5, wherein in the load devices are hydraulic cylinders, the controller in communication with at least one of a pump, reservoir and valves connected to the hydraulic cylinder to generate the thrust, radial and yaw loads.

7. The wind turbine gearbox test cell according to claim 5, wherein the first set of load devices is arranged in a vertical direction and the second set of load devices is arranged in a horizontal direction.

8. The wind turbine gearbox test cell according to claim 7, wherein the cradle includes a bottom wall generally parallel with the base, the first set of load devices arranged between the base and the bottom wall.

9. The wind turbine gearbox test cell according to claim 8, wherein the base includes spaced apart sidewalls on each of opposing sides and extending vertically from the bottom wall, and the cradle includes an ear on each of the opposing sides and each arranged between a respective pair of the sidewalls, the load devices of the second set provided between the ears and their respective sidewalls.

10. The wind turbine gearbox test cell according to claim 9, wherein the cradle includes a clevis on each of the sides configured to support the wind turbine gearbox.

11. The wind turbine gearbox test cell according to claim 4, further comprising a second dynamometer configured to be coupled to an output shaft connected to the wind turbine gearbox, and an additional gearbox interconnected between at least one of the first and second dynamometers and the wind turbine gearbox.

12. A method of testing a wind turbine gearbox comprising:
- providing at least one dynamometer, a primary gearbox and a secondary gearbox, the dynamometer and primary and secondary gearboxes respectively coupled to one another in series in a first test configuration, and the dynamometer and one of the primary and secondary gearboxes coupled to one another in a second test configuration without the other of the primary and secondary gearboxes;
- configuring the dynamometer and primary and secondary gearboxes in a test cell in one of the first and second configurations;
- operatively coupling an input shaft to one of the primary and secondary gearboxes;
- supporting a wind turbine gearbox in a gearbox test device;
- operatively coupling the wind turbine gearbox to the input shaft;
- operatively coupling the wind turbine gearbox to one of a windmill generator and a simulated generator; and
- loading the wind turbine gearbox with at least one of thrust, radial and yaw loads simulating a wind turbine gearbox loading event.

* * * * *